United States Patent [19]

Melinat

[11] 4,342,380
[45] Aug. 3, 1982

[54] LIGHT WEIGHT DISC BRAKE CALIPER
[75] Inventor: Wolfgang Melinat, Dayton, Ohio
[73] Assignee: General Motors Corporation, Detroit, Mich.
[21] Appl. No.: 191,361
[22] Filed: Sep. 29, 1980
[51] Int. Cl.³ .......................................... F16D 55/224
[52] U.S. Cl. .................... 188/71.1; 188/73.31
[58] Field of Search ............... 188/71.1, 72.1, 72.4, 188/73.3, 73.4, 218 R, 370, 73.31, 73.43, 73.45, 73.47

[56] References Cited

U.S. PATENT DOCUMENTS

| | | | |
|---|---|---|---|
| 2,129,199 | 9/1938 | Dake | 188/218 R |
| 3,182,754 | 5/1965 | Hahm et al. | 188/73.3 |
| 3,184,005 | 5/1965 | Thirion | 188/73.3 |
| 3,338,339 | 8/1967 | Buyze | 188/73.3 |
| 3,705,641 | 12/1972 | Brooks et al. | 188/73.3 |
| 3,734,243 | 5/1973 | Girauldon | 188/370 |
| 4,031,986 | 6/1977 | Thompson | 188/71.1 |
| 4,094,389 | 6/1978 | Brip et al. | 188/73.3 |
| 4,162,721 | 7/1979 | Moriya | 188/73.3 |

FOREIGN PATENT DOCUMENTS 1480132  5/1969  Fed. Rep. of Germany ..... 188/71.1

Primary Examiner—Edward R. Kazenske
Attorney, Agent, or Firm—D. D. McGraw

[57] ABSTRACT

A disc brake caliper having a piston housing, preferably made of aluminum, cast on a U-shaped stamped steel bridge. The bridge is formed from an H-shaped flat blank with the legs being bent to obtain the desired U-shaped cross section. The piston housing encompasses one pair of legs on one side of the bridge.

3 Claims, 3 Drawing Figures

LIGHT WEIGHT DISC BRAKE CALIPER

The invention relates to a disc brake caliper having a one-piece composite body composed of a high strength sheet metal bridge and a cast piston housing. The bridge is preferably steel and the piston housing may be cast of aluminum or other suitable material. The piston housing is cast directly onto the bridge, eliminating the need for handling, machining, assembling, and bolting together two separate caliper body components. The caliper construction, using steel and aluminum, will yield a weight reduction of about 20% to 30% over similar sized nodular iron calipers and may be manufactured on modified production equipment. All lateral movements of the caliper are retained and guided by bolts extending through holes in the caliper so that the caliper is mounted to a knuckle. Knuckle abutments are used to transmit the braking forces from the rotor through the outboard shoe and lining assembly and inboard shoe and lining assembly through the caliper bridge into the knuckle. Due to the low heat expansion of the steel bridge, tight clearances can be held between the caliper and both knuckle abutments, minimizing caliper twist during braking and minimizing taper wear on the brake linings.

The steel bridge is preferably formed from sheet material having a generally flat H-shape in initial form and preformed into a generally inverted U-shape. One side of the inverted U-shape is integrally cast within the piston housing portion to form an anchor therewith.

IN THE DRAWING

Figure 1:
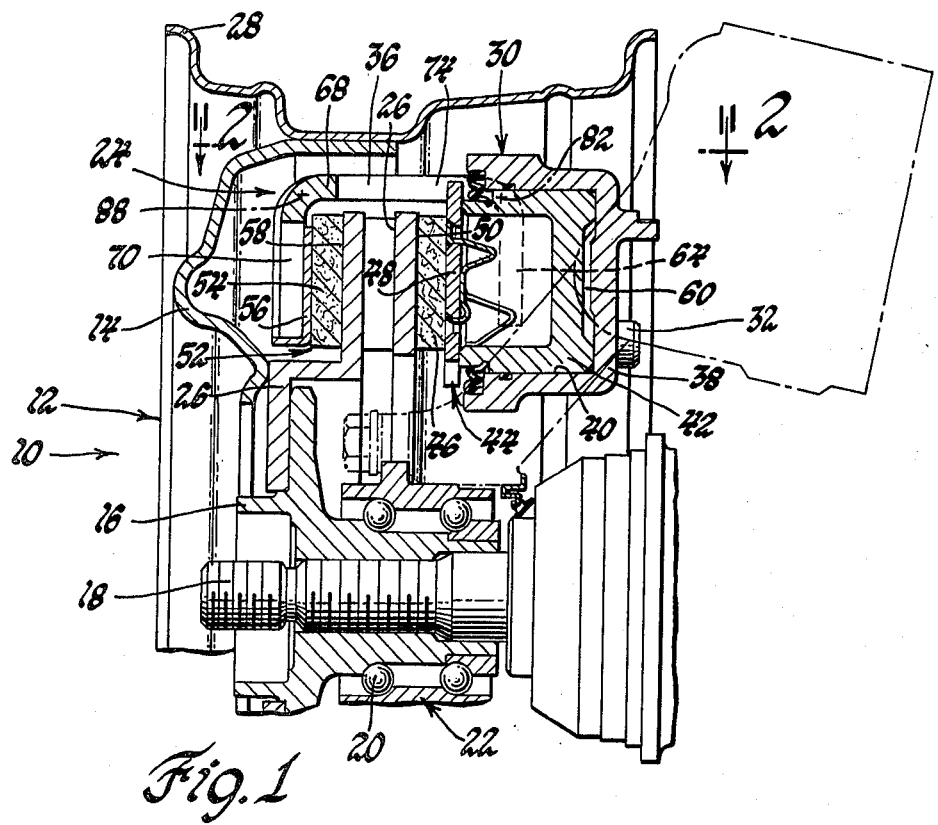
FIG. 1 is a cross-section view of a disc brake and wheel assembly embodying the invention, with parts broken away and in section.
Figure 2:
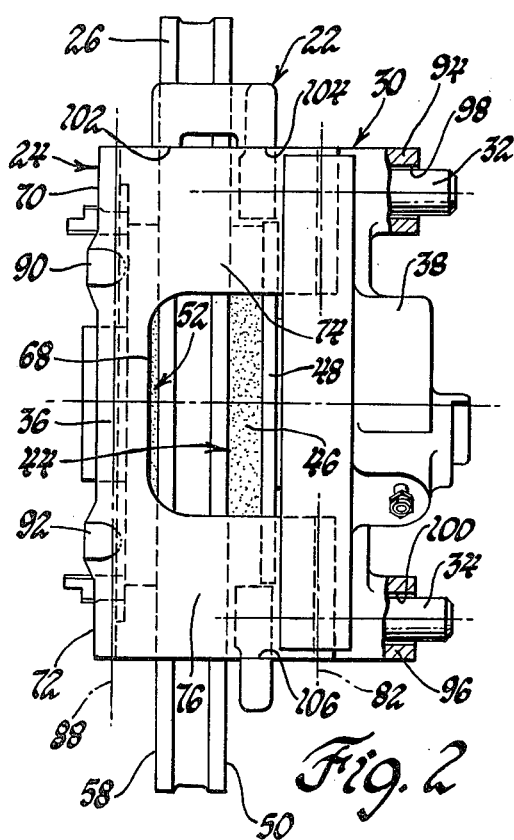
FIG. 2 is a plan view taken in the direction of arrows 2—2 of FIG. 1 illustrating the caliper embodying the invention.

The wheel and brake assembly 10 of FIG. 1 is illustrated as being part of a front wheel drive vehicle. The brake caliper embodying the invention is also equally adaptable to be used on other vehicle wheels. The wheel assembly 12 is illustrated as including the wheel 14 secured to the wheel hub 16. The hub is connected to the drive axle 18 and is rotatably mounted by means of a bearing 20 to a portion of the steering knuckle 22. The disc brake assembly 24 includes a rotor or disc 26 which is also secured to the wheel hub 16 so that it is rotatable with the wheel 14. It is positioned inside the rim portion 28 of the wheel 14. The disc brake assembly 24 also includes the caliper assembly 30, which is slidably mounted on portions of the steering knuckle 22 by means of bolts 32 and 34, better shown in FIG. 2. The caliper assembly 30 includes a high strength sheet metal bridge 36 and a cast piston housing 38. The recessed cylinder 40 in piston housing 38 is formed to reciprocably receive piston 42 therein. The inboard disc brake pad assembly 44, including a lining 46 and a backing plate 48, is secured to piston 42 so that the face of lining 46 is in braking engageable relation with one surface 50 of the disc 26. The outboard disc brake pad assembly 52, including a lining 54 and a backing plate 56, is mounted on a portion of the caliper bridge 36 so that the face of the lining 54 is in braking engageable relation with the other braking surface 58 of the disc 26. Suitable hydraulic connections are made so that hydraulic brake fluid may be introduced into the chamber 60, formed by the recess 40 of piston housing 38 and the piston 42, to actuate the brake assembly.

Figure 3:
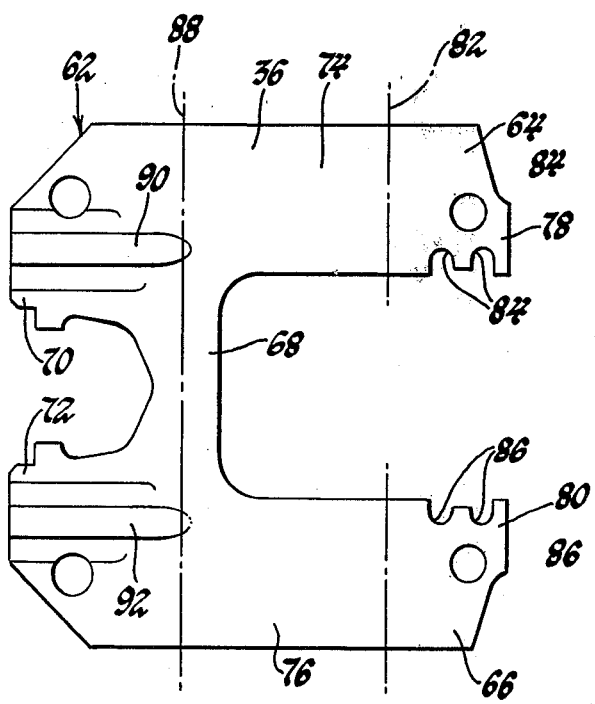
FIG. 3 is a plan view of the high strength sheet metal bridge as it is formed from flat stock into a generally H-shape.

The caliper bridge 36 is illustrated in FIG. 3 in a preform which is preferably made from flat stock and is generally H-shaped in plan view. The H-shaped preform 62 has a first pair of spaced legs 64 and 66, a cross piece 68, and a second pair of spaced legs 70 and 72. Legs 64 and 66 extend transversely from the cross piece 68 in a direction opposite that of legs 70 and 72. Legs 64 and 66 have portions 74 and 76 adjacent cross piece 68 and defining spans. Legs 64 and 66 have outer end portions 78 and 80. The outer end portions 78 and 80 are bent along an axis 82 which is generally parallel to and spaced from the cross piece 68. The bends of these leg outer end portions are such that the outer end portions 78 and 80 extend generally perpendicular to the spans 74 and 76. The outer end sections 78 and 80 have irregular surfaces 84 and 86 which provide for casting security, as will be further described in relation to the piston housing 38.

The legs 70 and 72 and the cross piece 68 are bent along another axis 88 so as to extend generally perpendicular to the spans 74 and 76 to form in conjunction with those spans and the first legs 64 and 66 a generally U-shaped cross section as best shown in FIG. 1. Axis 88 extends through the cross piece 68 and is parallel to axis 82. In a preferred form the legs 70 and 72 and portions of the cross piece 68 have shaped reinforcing means 90 and 92 formed as integral parts thereof so as to provide additional caliper deflection resistance. The reinforcing means 90 and 92 are illustrated as being ridges formed during the stamping process of manufacturing the preform 62.

The piston housing 38 is preferably cast using a suitable aluminum alloy. It is cast directly onto the bridge legs 64 and 66 so as to enclose the outer end portions of those legs and particularly so that it grips the irregular surfaces 84 and 86 thereof for casting security. The legs 64 and 66 are spaced sufficiently apart so that the cylinder or recess 40 is positioned between the legs. The cylinder 40, a portion of which defines the chamber 60, is so arranged that the piston chamber extends axially generally parallel to the spans 74 and 76. The piston housing 38 is provided with bosses 94 and 96 on either side of the cylinder 40. The bosses are provided with openings 98 and 100 extending axially therethrough parallel to the axis of the cylinder 40. The openings are arranged to receive the caliper mounting pins or bolts 32 and 34 therethrough in caliper sliding relation.

The steering knuckle 22 is formed to provide knuckle abutments 102, 104 and 106. The knuckle abutments are used to transmit the braking forces from the disc 26 through the outboard disc brake pad assembly 52 and the inboard disc brake pad assembly 44 through the caliper bridge 36 into the knuckle 22. Due to the low heat expansion of the steel bridge 36, tight clearances can be held between the caliper and the knuckle abutments, minimizing caliper twist during braking and therefore minimizing taper wear on the linings 46 and 56. Since caliper twist is tightly controlled by the abutments, sufficient clearances can be provided between the caliper mounting bolts 32 and 34 and the caliper mounting bolt holes 98 and 100 in the piston housing to allow for the increased heat expansion of an aluminum piston housing without ill effect on taper wear.

The embodiments of the invention in which an exclusive property or privilege is claimed are defined as follows:

1. A composite caliper characterized by light weight and high strength for use in a disc brake and having one side formed by a sheet steel portion adapted to form a bridge for the caliper and the other side formed by a cast metal portion adapted to define a piston chamber for the caliper, said sheet steel bridge portion having an initial generally flat H-shape defined by first and second sets of legs and a cross-piece of predetermined strength preformable therefrom into a generally inverted U-shape by bending along a first axis extending through said cross-piece and along a second axis parallel to said first axis and spaced from said cross-piece, one side of the inverted U-shape including said first set of legs integrally cast within said cast metal portion to form an anchor therewith and to place the other side of the inverted U-shape including said second set of legs opposite the piston chamber for receiving a brake disc therebetween, said one side of the inverted U-shape being configured to enhance the integrity of the anchor between said sheet steel portion and said cast metal portion while the other side of the inverted U-shape is configured to enhance the predetermined strength of the sheet steel portion and cooperating thereby to effect the light weight, high strength characteristics of said caliper.

2. A disc brake caliper comprising:

a high strength steel bridge formed from flat sheet metal stock into a generally H-shape in plan view to provide a first leg section and a cross-piece and a second leg section, said first leg section including first legs extending transversely from said cross-piece, said first legs and said cross-piece being bent along a first axis extending through said cross-piece, said second leg section including second legs extending transversely from said cross-piece in a direction opposite said first legs and having outer end portions bent along a second axis generally parallel to and spaced from said cross-piece, said leg section and said cross-piece then forming a generally U-shaped cross section;

and a cast piston housing cast directly onto said bridge, said piston housing being of a lighter weight material than said bridge and forming a piston chamber;

said bridge first leg section forming a portion of the caliper adapted to mount a first disc brake shoe and lining assembly, said second legs extending from said second axis generally parallel to and in the same general direction as said first legs and spaced apart at least the diameter of said piston chamber, said second legs being cast into said piston housing when said piston housing is cast onto said bridge so that said piston chamber is between said second legs and opens towards said first leg section, said bridge having abutments formed thereon adapted to locate and receive brake torque from a second disc brake shoe and lining assembly adjacent said piston housing;

said piston housing having a pair of parallel openings therethrough on opposite sides of said piston chamber and parallel thereto, and caliper mounting bolt means extending through said openings in operably slidable relation for mounting said caliper on a fixed mount in slidable relation for brake actuation and release.

3. A disc brake caliper comprising:

a high strength sheet metal bridge formed from flat stock into a generally H-shape in plan view to provide a first pair of spaced legs and a cross-piece and a second pair of spaced legs, said first pair of legs extending transversely from said cross-piece in a direction opposite said second pair of legs and having portions adjacent said cross-piece defining spans and having outer end portions thereof bent along a first axis generally parallel to and spaced from said cross-piece so as to extend generally perpendicular to said spans, said outer end portions having irregular surfaces for providing casting security, said second pair of legs and said cross-piece being bent along a second axis parallel to said first axis and extending through said cross-piece so as to extend generally perpendicular to said spans to form in conjunction with said spans and said first legs a generally U-shaped cross section, said second legs and said cross-piece having shaped reinforcing means formed as integral parts thereof so as to provide caliper deflection resistance;

and a cast piston housing cast directly onto said bridge first legs to enclose said first legs and particularly gripping said irregular surfaces thereof for casting security, said piston housing having a recess formed therein and opening toward said second legs and defining a piston chamber extending axially generally parallel to said spans and generally perpendicular to said legs, said piston housing further having bosses on either side of said piston chamber, said bosses being provided with openings therethrough extending axially parallel to said piston chamber, said openings being adapted to receive caliper mounting pins therethrough in caliper sliding relation.

* * * * *